Nov. 24, 1959     G. K. MURPHY     2,914,002
HIGH CAPACITY PRIVATE COMPARTMENT PASSENGER VEHICLE
Filed Nov. 27, 1956     4 Sheets-Sheet 1
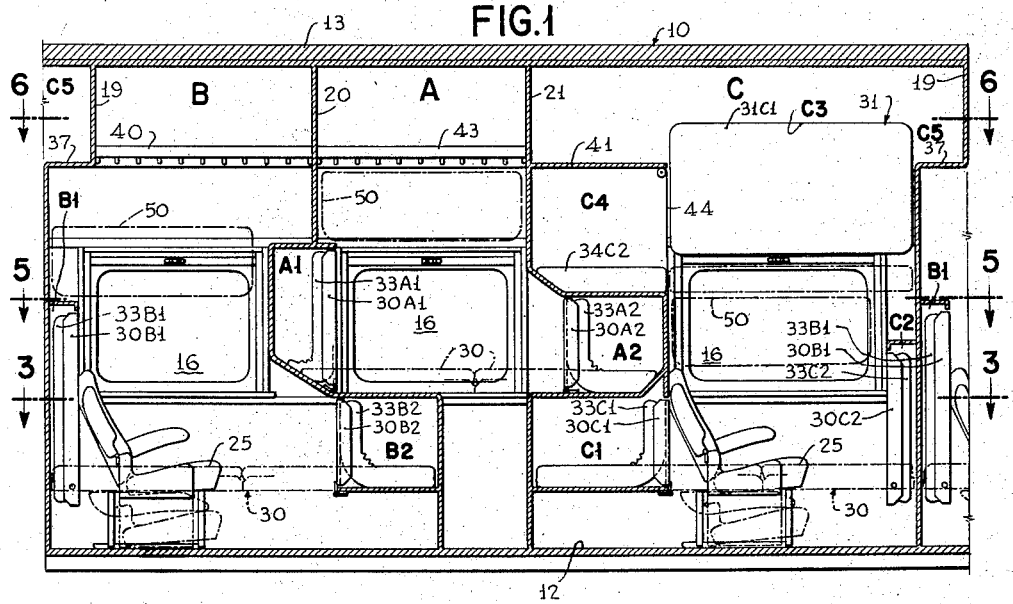
INVENTOR
Goodrich K. Murphy
BY Wm. R. Glisson
ATTORNEY Nov. 24, 1959  G. K. MURPHY  2,914,002
HIGH CAPACITY PRIVATE COMPARTMENT PASSENGER VEHICLE
Filed Nov. 27, 1956  4 Sheets-Sheet 2

INVENTOR
BY Goodrich K. Murphy
Wm. R. Glison
ATTORNEY

Nov. 24, 1959 G. K. MURPHY 2,914,002
HIGH CAPACITY PRIVATE COMPARTMENT PASSENGER VEHICLE
Filed Nov. 27, 1956 4 Sheets-Sheet 3
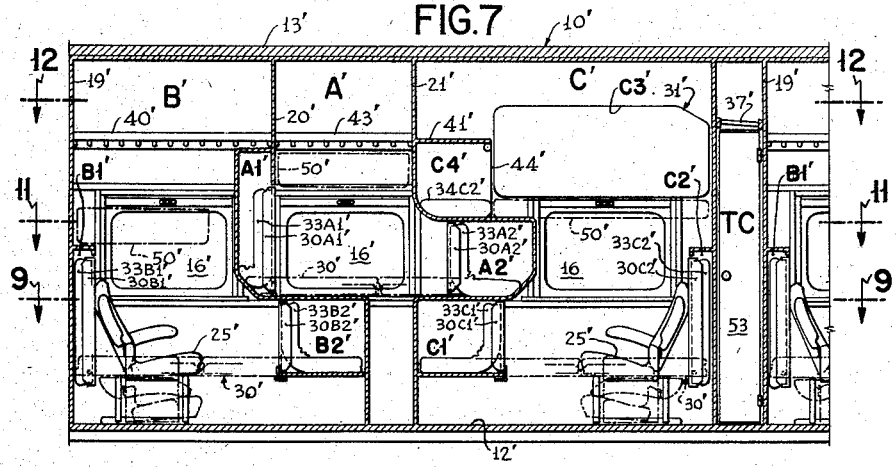
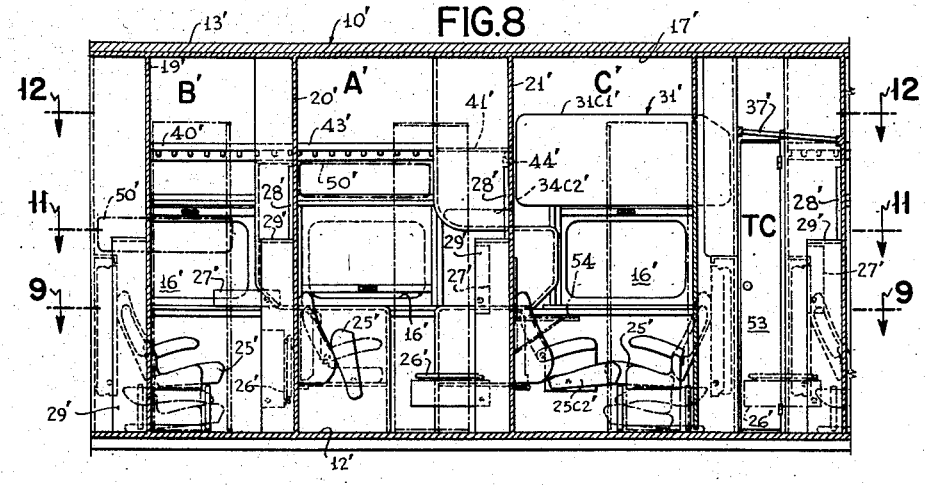
INVENTOR
Goodrich K. Murphy
BY
Wm. R. Glisson
ATTORNEY Nov. 24, 1959   G. K. MURPHY   2,914,002
HIGH CAPACITY PRIVATE COMPARTMENT PASSENGER VEHICLE
Filed Nov. 27, 1956   4 Sheets-Sheet 4
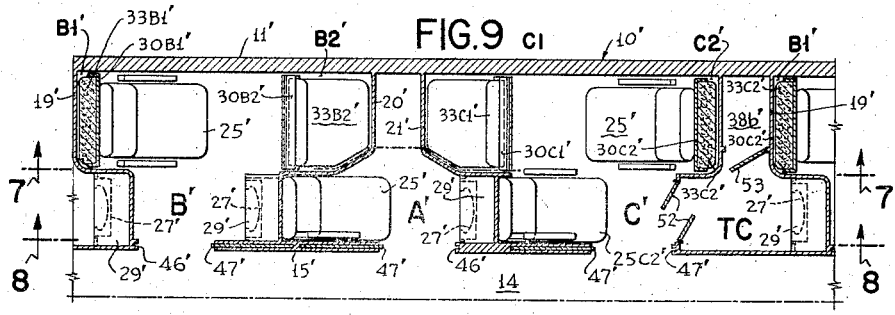
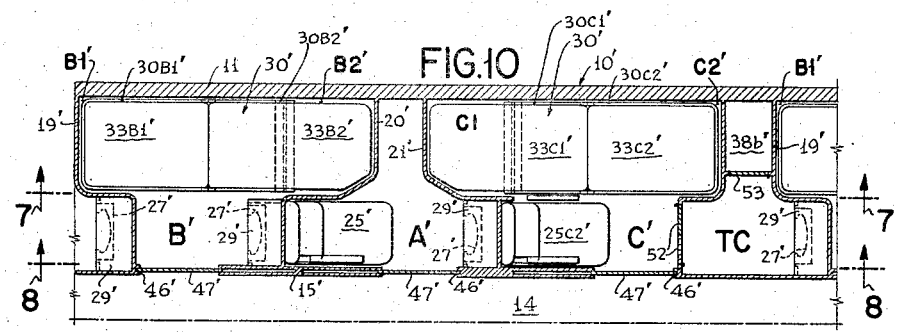
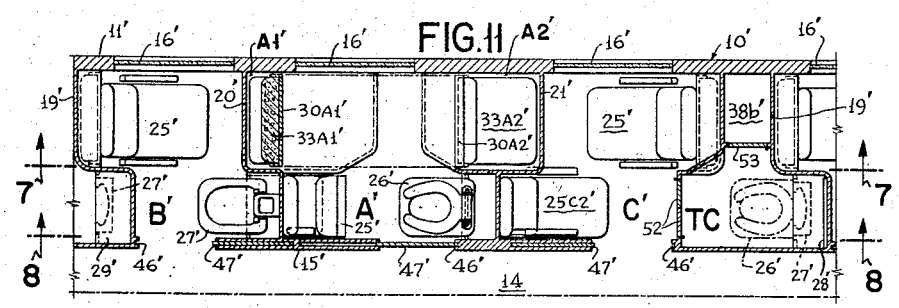
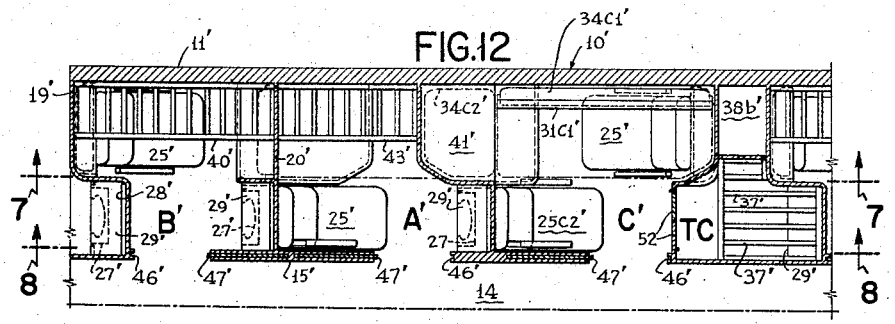
INVENTOR
Goodrich K. Murphy
BY
Wm. R. Glisson
ATTORNEY

2,914,002

HIGH CAPACITY PRIVATE COMPARTMENT PASSENGER VEHICLE

Goodrich K. Murphy, New Canaan, Conn., assignor to The Budd Company, Philadelphia, Pa., a corporation of Pennsylvania Application November 27, 1956, Serial No. 624,610

5 Claims. (Cl. 105—315)

This invention relates to high capacity private compartment vehicles which provide sitting, standing, sleeping and toilet facilities for each compartment and has for an object the provision of improvements in this art.

The present invention is an improvement upon the arrangements disclosed in my co-pending application, Serial No. 343,870, filed March 23, 1953, now Patent No. 2,808,787, issued October 8, 1957, and my Patent No. 2,583,960, issued January 29, 1952. The arrangement disclosed herein is related to that of my co-pending application Serial No. 540,300, filed October 13, 1955, the present application being for different forms of the same general arrangement.

The arrangements provide sitting, standing, sleeping and toilet accommodations in a compartment space which is less than reclining width, being about twice sitting with; which is in part of standing height and in part of less than standing height; and which is in part of reclining length and in part of less than reclining length. When passenger size is referred to herein it means the size of a normal adult of about six feet height and average proportions, this being the size for which most passenger accommodations are designed. Double sitting width corresponds to the space in a normal railway passenger car between a center aisle wall and a side wall.

In the patent, the compartments include bed-space alcoves which project as boots into the adjacent space, the boots being arranged in horizontally stagged disposition. The arrangement has the advantage that all compartment floors are on a common level coinciding with the level of the center aisle floor but the disadvantage that in some compartments the bed in the use position is located between the standing space and the aisle.

In the earlier of the two co-pending applications mentioned the boots are arranged in vertically staggered disposition. This has the advantage that in every compartment the bed space is located at the outer wall, leaving free access between the bed and the aisle. Some compartments have a floor level above the aisle floor level. The beds are on two levels and all rooms are for single sleeping occupancy.

In the other co-pending application referred to the beds are on three levels instead of two, this being made possible by arranging the compartments in groups or modules of three instead of two, one of the three compartments being designed for double occupancy. In the specific forms illustrated in that application the floor of one of the compartments is at an elevation above the level of the aisle floor. In the present application the floors of all compartments are at aisle floor level.

With the arrangement of three rooms in a group and with three bed levels each compartment is somewhat roomier, there is one bed in each of at least two compartments at sitting height from the floor and only the upper bed of the double-occupancy compartment is at a height much greater than sitting height from the floor or a seat. All beds are on the outer wall side of the compartments.

The arrangements shown specifically in the second copending application, by using two floor levels, gave especially commodious and convenient accommodations with only a slightly elevated floor and a higher window for one compartment as possibly less attractive features. The arrangements were suitable for all normal height cars and some of the low height cars.

The arrangements of the present application are suitable for the lowest height cars which are being designed or which can be designed for use if passengers are to have standing height accommodations.

The present design has the great advantage that all compartment floors are at aisle level and all windows are at a common level.

Accordingly it is an object of the present invention to provide high-capacity yet comfortable and completely acceptable accommodations for low-height cars which have at least the following characteristics:

(1) All floors at aisle floor level;
(2) All windows at a common level;
(3) All beds at the outer wall side;
(4) A seat in each compartment facing in a common direction;
(5) The seats of at least two of the group of three compartments being at the outer wall side and being as wide as the bed;
(6) A bed in each compartment which is at sitting height from the floor or other stable support such as a seat;
(7) All beds of a comfortable width, that is at least half the compartment width and as wide as ample sitting width;
(8) A toilet for each compartment accessible with full sitting length at all times;
(9) Standing space alongside the bed zone at all times, in front of the toilet at all times, in front of the seat at all times except when the beds are in the use position, and in front of the aisle door at all times;
(10) Beds of full length when made for use, which can be quickly made ready for use or stowed, and which with bedding are fully enclosed when stowed;
(11) Ample baggage space in each room clear of beds and bed movements.

Another object is to provide suitable space and supports in at least one or more of the compartments for an infant's hammock or crib.

Another object is to provide a wardrobe for one or more of the compartments or a toilet annex for one of the compartments when it is desired to work it into the design for construction; that is to have a basic module which will permit such facilities to be provided without encroaching too much on the accommodations for other compartments.

The above-mentioned and other objects and various novel features of the invention will be apparent from the following description of certain exemplary embodiments, reference being made to the accompanying drawings thereof, wherein:

Fig. 1 is a vertical longitudinal section through a car equipped with the present accommodations, the view being taken on the line 1—1 of Figs. 3, 4, 5 and 6, showing the beds in stowed position in full lines and in made or use position in broken lines;

Fig. 2 is a vertical longitudinal section on the line 2—2 of Figs. 3, 4, 5 and 6;

Fig. 7 is a vertical longitudinal section through a car equipped with a modified arrangement, the section being taken on the line 7—7 of Figs. 9, 10, 11 and 12;

Fig. 8 is a vertical longitudinal section taken on the line 8—8 of Figs. 9, 10, 11 and 12;

Fig. 9 is a horizontal section taken on the line 9—9 of Figs. 7 and 8 with the beds stowed;

Fig. 10 is a horizontal section taken on the same line as Fig. 9 but showing the beds made up for use;

Fig. 11 is a horizontal section taken on the line 11—11 of Figs. 7 and 8; and

Fig. 12 is a horizontal section taken on the line 12—12 of Figs. 7 and 8.

Figure 3:
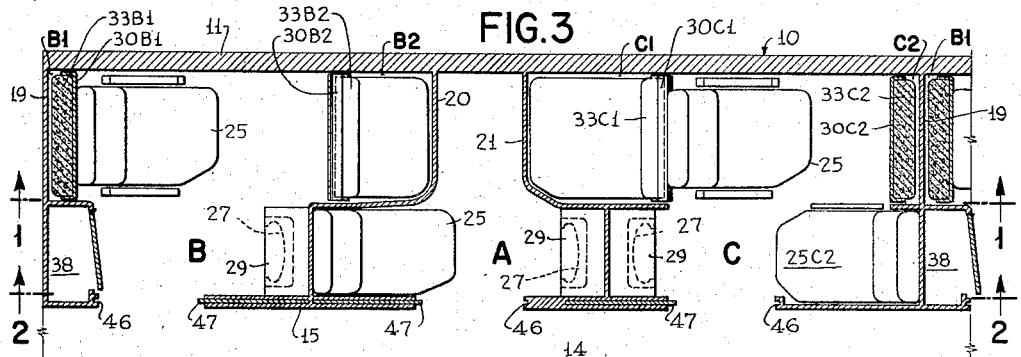
Fig. 3 is a horizontal section taken on the line 3—3 of Figs. 1 and 2 showing the beds in stowed position.
Figure 4:
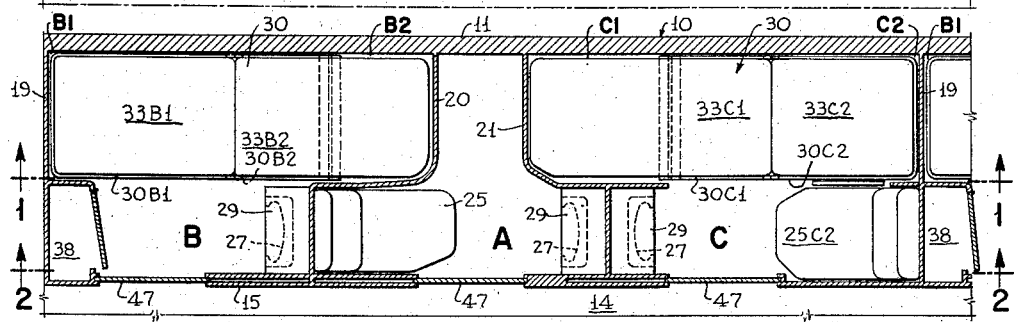
Fig. 4 is a horizontal section like Fig. 3 but with the beds in the made or use position.
Figure 5:
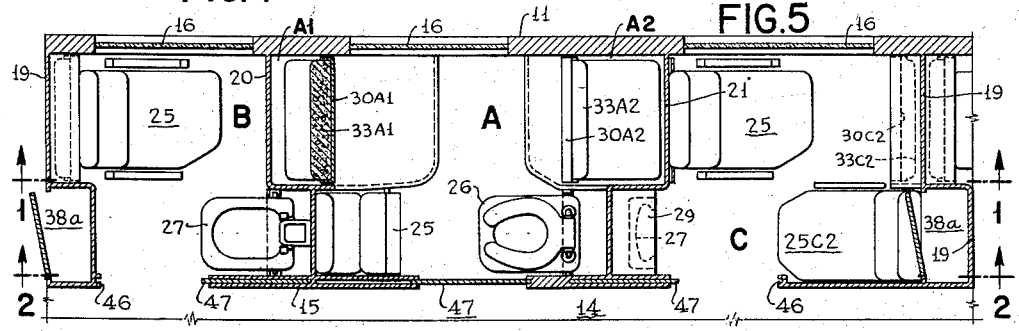
Fig. 5 is a horizontal section taken on the line 5—5 of Figs. 1 and 2.
Figure 6:
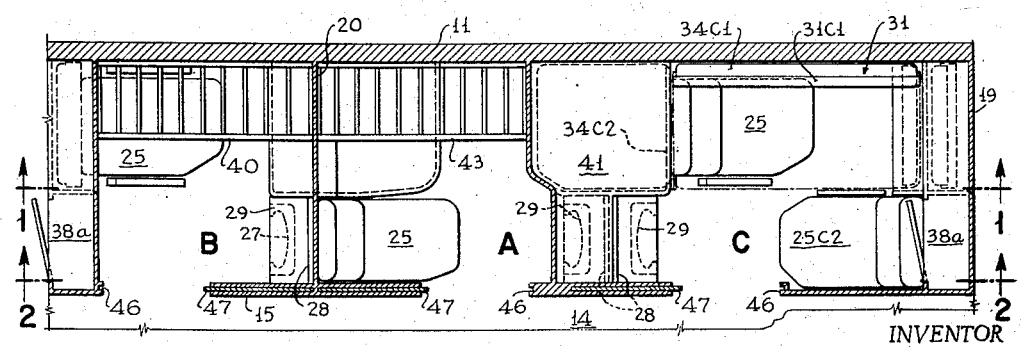
Fig. 6 is a horizontal section taken on the line 6—6 of Figs. 1 and 2.

In the first embodiment, shown in Figs. 1 to 6, a railway car 10 has longitudinal outer side walls 11, a floor 12, a roof 13, a center aisle 14, aisle walls 15, windows 16, and an aisle ceiling. Between an aisle wall 15 and a side wall 11 on each side there are provided a plurality of transverse partition walls, 19, 20, and 21 dividing the space into a plurality of separate passenger compartments or rooms, A, B and C, constituting a group unit or module which can be repeated indefinitely as long as there is enough car space. For example, a standard length car 85 feet long will take ten such units, five on each side, which furnish twenty singles and ten doubles to accommodate forty passengers, to a car. In such a car there can also be a general toilet, an electric locker, two linen lockers, vestibule, and some other general facilities.

The three compartments of a group unit include two single-occupancy compartments, A and B, and a double occupancy compartment C, all having floors at aisle floor level.

In each compartment there is arranged a folding seat 25, a folding toilet 26, a folding wash basin 27, and a bed 30. Herein the toilet and basin are both carried by a common cabinet 29. One such cabinet unit with basin and toilet which is available on the market is known as a "Travel-lab." The bed elements of the different rooms are somewhat different so they will be designated by a suffix A, B or C, to show which room they serve.

In room A there is a folding head end bed frame 30A1 which folds up in an alcove A1 and a folding foot end bed part 30A2 which folds up to cover the front opening of a bedding alcove A2. The mattress parts are designated 33A1 and 33A2.

In room B there is a folding head end bed frame part 30B1 which folds up in an alcove B1 behind the folding seat back and a folding foot end bed part 30B2 which folds up to cover the front opening of a bedding alcove B2. The mattress parts are designated 33B1 and 33B2.

In room C, the double, there is a lower bed comprising a folding head end bed frame part 30C1 in an alcove C1 and a folding foot end bed frame part 30C2 in an alcove C2. The bed mattress parts are designated as 33C1 and 33C2.

In room C, there is also an upper bed 31 comprising an edge-hinged bed frame part 31C1 with a mattress part 34C1 stowable in a side wall and ceiling recess C3, and a fixed bed mattress part 34C2 secured on the bottom of an alcove C4. The bed could be made in a single length by omitting a bag rack. It is to be noted from Fig. 1 that each bed support includes a hinged part and a fixed part, the fixed part being the bottom wall portion of an alcove. In alcove A1 the bottom wall portion is inclined at the inner end to support a short portion of the mattress part 33A1; in alcove A2 the bottom wall portion is largely horizontal with a short inclined portion to support a considerable portion of the mattress part 33A2; in alcove B1 the entire mattress support part 30B1 is hinged; in alcove B2 the bottom wall portion is horizontal to support about half of the mattress part 33B2; in alcove C1 the bottom wall portion is horizontal to support about half of the mattress part 33C1; in alcove C2 the entire mattress support part 30C2 is hinged; and in alcove C4 the bottom wall portion is horizontal to support the upper mattress part 34C2.

It is to be noted that all of the beds are located in a vertical longitudinal zone at the outer wall; that there are seats in all compartments facing in the same or forward direction, the seats for two compartments B and C, being at the outer wall; and that the toilets and wash basins are all located clear of the bed zone and adjacent the aisle wall where they are available for use at all times. In two of the rooms the toilets are located at the end opposite the principal seat and in one room, C, the toilet is located rearwardly of the forward-facing seat.

In the double, C, room there is a second seat 25C2 located on the aisle side in front of the toilet. The upper part of the back rest of the seat folds down to form a step 32 to reach the upper bed; and the seat cushion folds up to provide easier passage to the outer seat.

The transverse partition wall 19 between the room C and the room B (of another group) is plane in the lower part behind the bed alcove B1 but is provided with a recess or alcove C5 across the top at the front end to form a baggage rack 37 for room C. The space in room B between the seat and the aisle wall in front of the lower part of partition 19 forms a wardrobe 38 for compartment B. Above this a wardrobe 38a has a door opening to compartment C.

The wall 20 between compartments A and B is reversely offset vertically at the outer side to form the bed alcoves A1 and B2, with the lower or bottom wall portions forming fixed bed support elements, and at the aisle side is offset horizontally to take the toilet, basin, and a mirror 28 of compartment B.

Compartment B is provided with a baggage rack 40 over the window.

Compartment A is provided with a baggage rack 43 over the window.

The wall 21 between compartments A and C is reversely offset vertically near the outer wall to form the bed alcoves C4, A2 and C1, with the lower or bottom wall portions forming fixed bed support elements. On the aisle side the wall takes a medial position to back the toilet-basin units 29. Above the height needed for alcove C4 a baggage rack 41 is provided and on the aisle side this ledge may extend part width to provide additional ledge space. A roll curtain 44 is provided to close off the alcove C4.

The foot-end bed part in compartment B can be dropped down to provide a comfortable leg rest, or an infant's temporary bed.

Each compartment is provided with an aisle doorway 46 closed by a sliding door 47.

In the lowered position the bed parts are held up by struts and wall rests as described in the earlier co-pending application referred to but it is not necessary to show these details herein.

Infants' hammocks 50 are shown in dotted outline in compartments A and B in Fig. 1 to indicate how they can be accommodated without interfering with the movement of the bed parts.

The second embodiment, Figs. 7–12 is in most respects like the first and corresponding parts will be designated by the same reference characters with a prime (') added. These parts need not be described again.

The main differences are that the wardrobe 38 and 38a have been eliminated to provide a fully enclosed toilet annex TC for compartment C', the annex having a pair of hinged doors 52; that the main seat 25' has been moved to the other or front end of the compartment to face rearward; that the auxiliary seat 25C2' has been moved to the rear end of the compartment to face forward; that the shelf space 37' for compartment C' has been lengthened in the bed zone and extended over the top of the entire annex; and that compartment C' has been given a larger wardrobe 38b' behind the back of the main seat with a door 53 from the annex. There is a folding step 54 to aid in reaching the bed in compartment C'.

If the space for the annex of room C' in Figs. 7–12 is cut off even with the outer part of the room and this space put in room B' it will be possible to provide an aisle seat alongside the window seat in room B'. When this is done the annex of room C' will be smaller but still adequate and the large wardrobe will still be present. If it is desired to conserve space further the wardrobe of room C' can be eliminated and the room cut off even with the end of the bed alcove space. Then there will not be an enclosed toilet annex but a cabinet type toilet-basin fixture, as shown for rooms A' and B', can still be used. The last arrangement turns out to be fairly similar to that of Figs. 1–6 but gives a seat to room B' instead of a wardrobe to room C'. What is to be provided for each room will depend on what the traffic for different equipment demands.

It is thus seen that the invention provides improved accommodations which are very economical of space and which give comfort and facilities approaching those of first class pullman equipment yet at much lower rates so as to be competitive with less expensive forms of travel.

While certain embodiments of the invention have been illustrated and described with particularity, it is to be understood that there may be various modifications and embodiments within the general scope of the invention.

What is claimed is:

1. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of passenger occupancy compartments, each compartment being of approximately double sitting width and having an aisle door, a seat in each compartment, all seats being arranged at a common seating level, a window for each compartment, all windows being arranged at a common level, longitudinal full-length bed accommodations in each compartment at the outer wall side, the bed accommodations being approximately half the width of the compartment and leaving standing and sitting width space between the bed accommodations for their full length and the aisle wall, the bed accommodations each comprising bed parts at each of two spaced transverse walls of a compartment, the bed parts aligning horizontally when they are in their use position, the compartments being arranged in a group of three compartments adapted for repetition along the length of the vehicle, all of the compartments having floors at aisle floor level, the seats in all compartments being supported at aisle floor level, the windows being at a level for viewing therethrough when occupants are sitting in said seats, boot-alcove offsets for bed accommodations formed in the intermediate transverse walls at three levels, one bed level near the floor below the window level, one bed level adjacent the lower edge of the window, and one bed level adjacent the upper edge of the window, one of said intermediate transverse walls being offset longitudinally on the aisle side to provide space for a seat alongside the bed accommodation, and the adjacent one of said intermediate transverse walls being offset longitudinally to provide space in front of the seat for a toilet, the bed accommodations in the compartments being disposed partly in alcoves which overlap at each of the two adjacent intermediate walls of said plurality of transverse walls, the bed accommodations being arranged in three levels, the two adjacent intermediate transverse walls of the four transverse walls of a three-room unit each having longitudinally offset portions forming a bed alcove at each of two lower bed levels and one of said two intermediate transverse walls having a longitudinally offset portion forming a bed alcove at a third and uppermost bed level.

2. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of passenger occupancy compartments, each compartment being of approximately double sitting width and having an aisle door, a seat in each compartment, all seats being arranged at a common seating level, a window for each compartment, all windows being arranged at a common level, longitudinal full-length bed accommodations in each compartment at the outer wall side, the bed accommodations being approximately half the width of the compartment and leaving standing and sitting width space between the bed accommodations for their full length and the aisle wall, the bed accommodations each comprising bed parts at each of two spaced transverse walls of a compartment, the bed parts aligning horizontally when they are in their use position, the compartments being arranged in a group of three compartments adapted for repetition along the length of the vehicle, all of the compartments having floors at aisle floor level, the seats in all compartments being supported at aisle floor level, the windows being at a level for viewing therethrough when occupants are sitting in said seats, boot-alcove offsets for bed accommodations formed in the intermediate transverse walls at three levels, one bed level near the floor below the window level, one bed level adjacent the lower edge of the window, and one bed level adjacent the upper edge of the window, one of said intermediate transverse walls being offset longitudinally on the aisle side to provide space for a seat alongside the bed accommodation, and the adjacent one of said intermediate transverse walls being offset longitudinally to provide space in front of the seat for a toilet, the bed accommodations in the compartments being disposed partly in alcoves which overlap at each of the two adjacent intermediate walls of said plurality of transverse walls, the bed accommodations being arranged in three levels, the two adjacent intermediate transverse walls of the four transverse walls of a three-room unit each having longitudinally offset portions forming a bed alcove at each of two lower bed levels and one of said two intermediate transverse walls having a longitudinally offset portion forming a bed alcove at a third and uppermost bed level, a bed accommodation in two of said compartments being located at sitting height above the floor, and a bed accommodation in the other compartment of a group being located at greater than sitting height above the floor.

3. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of passenger occupancy compartments, each compartment being of approximately double sitting width and having an aisle door, a seat in each compartment, all seats being arranged at a common seating level, a window for each compartment, all windows being arranged at a common level, longitudinal full-length bed accommodations in each compartment at the outer wall side, the bed accommodations being approximately half the width of the compartment and leaving standing and sitting width space between the bed accommodations for their full length and the aisle wall, the bed accommodations each comprising bed parts at each of two spaced transverse walls of a compartment, the bed parts aligning horizontally when they are in their use position, the compartments being arranged in a group of three compartments adapted for repetition along the length of the vehicle, all of the compartments having floors at aisle floor level, the seats in all compartments being supported at aisle floor level, the windows being at a level for viewing therethrough when occupants are sitting in said seats, boot-alcove offsets for bed accommodations formed in the intermediate transverse walls at three levels, one bed level near the floor below the window level, one bed level adjacent the lower edge of the window, and one bed level adjacent the upper edge of the window, one of said intermediate transverse walls being offset longitudinally on the aisle side to provide space for a seat alongside the bed accommodation, and the adjacent one of said intermediate transverse walls being offset longitudinally to provide space in front of the seat for a toilet, the bed accommodations in the compartments being disposed partly in alcoves which overlap at each of the two adjacent intermediate walls of said plurality of transverse walls, the bed accommodations being arranged in three levels, the two adjacent intermediate transverse walls of the four transverse walls of a three-room unit each having longitudinally offset portions forming a bed alcove at each of two lower bed levels and one of said two intermediate transverse walls having a longitudinally offset portion forming a bed alcove at a third and uppermost bed level, a bed accommodation in each of said compartments being located at one of said two lower levels, and a bed accommodation in one of the compartments of a group being located at a greater than sitting level above the floor.

4. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of passenger occupancy compartments, each compartment being of approximately double sitting width and having an aisle door, a seat in each compartment, all seats being arranged at a common seating level, a window for each compartment, all windows being arranged at a common level, longitudinal full-length bed accommodations in each compartment at the outer wall side, the bed accommodations being approximately half the width of the compartment and leaving standing and sitting width space between the bed accommodations for their full length and the aisle wall, the bed accommodations each comprising bed parts at each of two spaced transverse walls of a compartment, the bed parts aligning horizontally when they are in their use position, the compartments being arranged in a group of three compartments adapted for repetition along the length of the vehicle, all of the compartments having floors at aisle floor level, the seats in all compartments being supported at aisle floor level, the windows being at a level for viewing therethrough when occupants are sitting in said seats, boot-alcove offsets for bed accommodations formed in the intermediate transverse walls at three levels, one bed level near the floor below the window level, one bed level adjacent the lower edge of the window, and one bed level adjacent the upper edge of the window, one of said intermediate transverse walls being offset longitudinally on the aisle side to provide space for a seat alongside the bed accommodation, and the adjacent one of said intermediate transverse walls being offset longitudinally to provide space in front of the seat for a toilet, the bed accommodations in the compartments being disposed partly in alcoves which overlap at each of the two adjacent intermediate walls of said plurality of transverse walls, the bed accommodations being arranged in three levels, the two adjacent intermediate transverse walls of the four transverse walls of a three-room unit each having longitudinally offset portions forming a bed alcove at each of two lower bed levels and one of said two intermediate transverse walls having a longitudinally offset portion forming a bed alcove at a third and uppermost bed level, a seat in the end two of said compartments being located at the outer wall side, a seat in the other compartment of a group being located at the aisle wall side, and a seat in each compartment facing in a common direction.

5. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of passenger occupancy compartments, each compartment being of approximately double sitting width and having an aisle door, a seat in each compartment, all seats being arranged at a common seating level, a window for each compartment, all windows being arranged at a common level, longitudinal full-length bed accommodations in each compartment at the outer wall side, the bed accommodations being approximately half the width of the compartment and leaving standing and sitting width space between the bed accommodations for their full length and the aisle wall, the bed accommodations each comprising bed parts at each of two spaced transverse walls of a compartment, the bed parts aligning horizontally when they are in their use position, the compartments being arranged in a group of three compartments adapted for repetition along the length of the vehicle, all of the compartments having floors at aisle floor level, the seats in all compartments being supported at aisle floor level, the windows being at a level for viewing therethrough when occupants are sitting in said seats, boot-alcove offsets for bed accommodations formed in the intermediate transverse walls at three levels, one bed level near the floor below the window level, one bed level adjacent the lower edge of the window, and one bed level adjacent the upper edge of the window, one of said intermediate transverse walls being offset longitudinally on the aisle side to provide space for a seat alongside the bed accommodation, and the adjacent one of said intermediate transverse walls being offset longitudinally to provide space in front of the seat for a toilet, the bed accommodations in the compartments being disposed partly in alcoves which overlap at each of the two adjacent intermediate walls of said plurality of transverse walls, the bed accommodations being arranged in three levels, the two adjacent intermediate transverse walls of the four transverse walls of a three-room unit each having longitudinally offset portions forming a bed alcove at each of two lower bed levels and one of said two intermediate transverse walls having a longitudinally offset portion forming a bed alcove at a third and uppermost bed level, one of said compartments having a smaller standing-height interior compartment enclosure at the aisle side, said smaller compartment enclosure comprising a toilet enclosure for one compartment, all compartments, including the one having the toilet enclosure, having longitudinally directed toilets at the aisle side so as to be useable at all times, said smaller compartment toilet enclosure being located at the end of an end compartment of a group which is distant from the other compartments of a group.

References Cited in the file of this patent

UNITED STATES PATENTS

| | | |
|---|---|---|
| 2,485,060 | Murphy | Oct. 18, 1949 |
| 2,583,960 | Murphy | Jan. 29, 1952 |
| 2,599,606 | Burgess | June 10, 1952 |
| 2,724,347 | Watter | Nov. 22, 1955 |
| 2,743,683 | Calhoun | May 1, 1956 |
| 2,808,787 | Murphy | Oct. 8, 1957 |